W. G. LEATHERS.
SPEEDOMETER.
APPLICATION FILED JULY 22, 1912.
1,143,978.
Patented June 22, 1915.
2 SHEETS—SHEET 1.
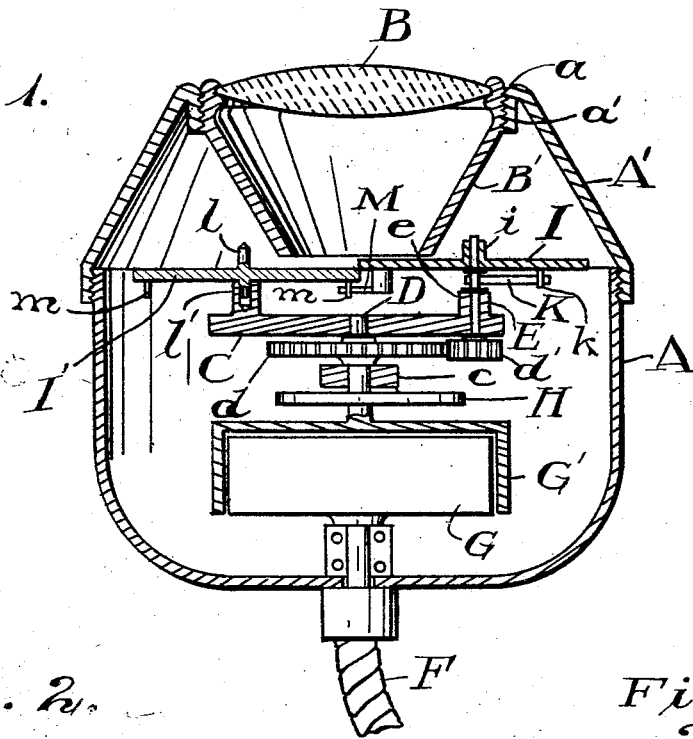
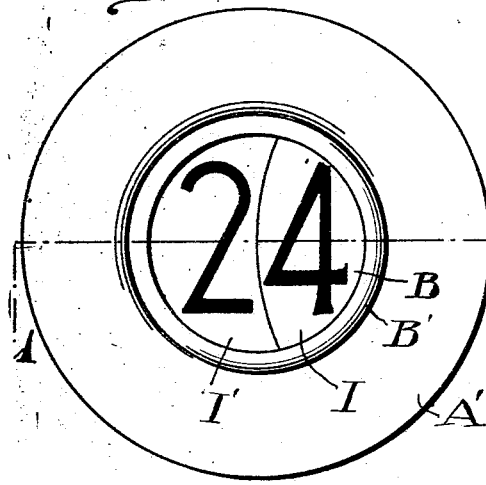
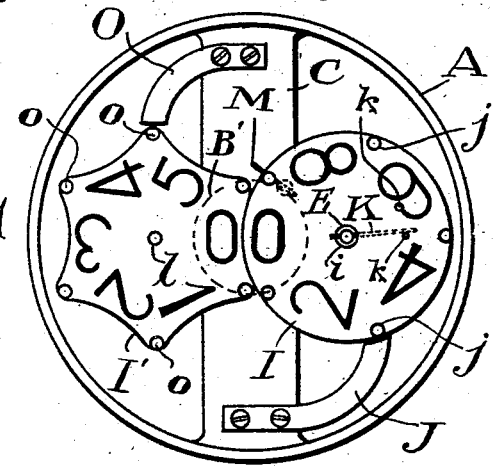
WITNESSES:
Cornelius Zabriskie
M. C. Rodriguez
INVENTOR
Ward G. Leathers,
BY
Griffin & Bernhard
ATTORNEYS W. G. LEATHERS.
SPEEDOMETER.
APPLICATION FILED JULY 22, 1912.
1,143,978.
Patented June 22, 1915.
2 SHEETS—SHEET 2.
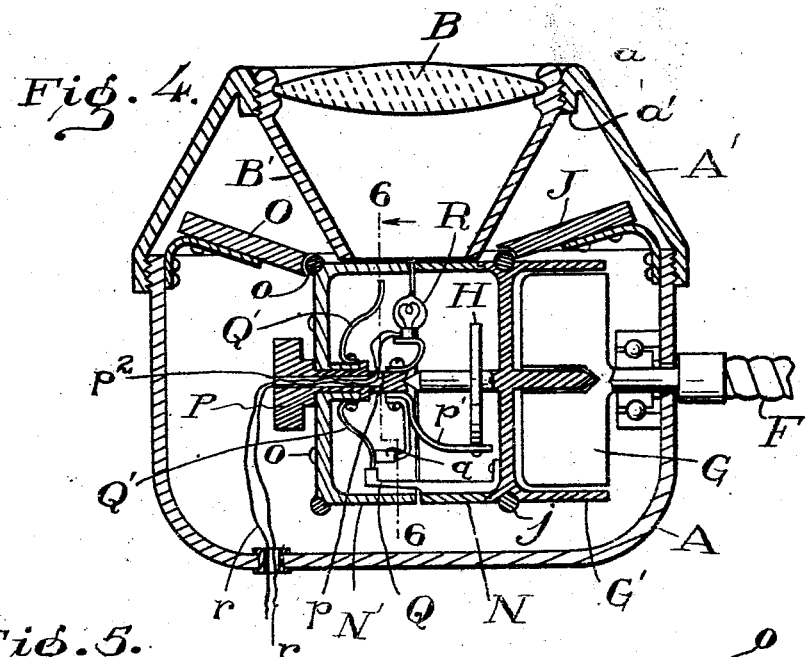
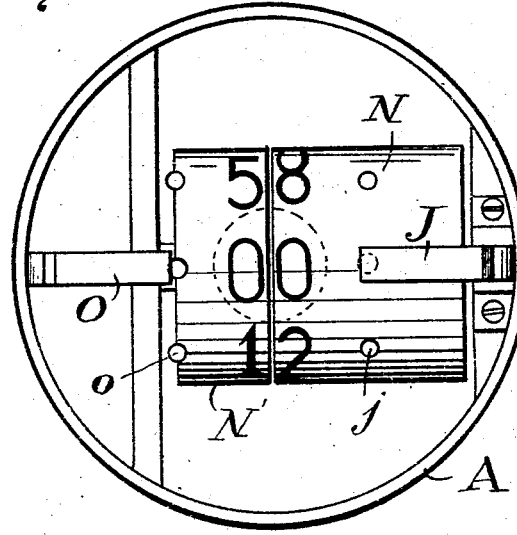
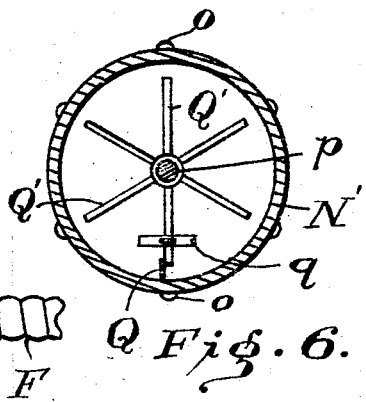
WITNESSES:
Cornelius Zabriskie
M. C. Rodriguez
INVENTOR
Ward G. Leathers.
BY
Griffin Bernhard
ATTORNEYS

UNITED STATES PATENT OFFICE.

WARD G. LEATHERS, OF NEW YORK, N. Y., ASSIGNOR TO STEWART-WARNER SPEEDOMETER CORPORATION, OF CHICAGO, ILLINOIS, A CORPORATION OF VIRGINIA.

SPEEDOMETER.

1,143,978.  Specification of Letters Patent.  Patented June 22, 1915.

Application filed July 22, 1912. Serial No. 710,343.

*To all whom it may concern:*

Be it known that I, WARD G. LEATHERS, a citizen of the United States, residing in the city of New York, borough of Manhattan, county and State of New York, have invented a certain new and useful Speedometer, of which the following is a specification.

This invention is a speedometer, the same being particularly adapted for use on motor-driven vehicles, such as automobiles.

The speedometers now in use on automobiles are characterized chiefly by the use of indicating members the figures and graduations of which are so small in size that they cannot be read without requiring fixed attention by the driver. As is well known, the indications given out by a speedometer vary or fluctuate within wide limits, particularly when an automobile is traveling through the streets of a city or village, such variation being due to the necessity for slowing down the automobile at street crossings, to stop in order that other vehicles and pedestrians may cross a roadway, to reduce the speed in compliance with the legal speed requirements, etc. Owing to such variations in the speed, the driver is required to watch the instrument constantly, but when it is considered that the driver must also give strict attention to the road ahead, and to manipulate various levers for controlling the clutch and brake of the machine, as well as to give warning signals, it will be apparent that very little time can be devoted to inspecting the speedometer readings.

The object of the invention is to enable the driver to read the speed indications by merely glancing at the instrument, and, furthermore, to simplify the device so as to render it compact, efficient and reliable.

The invention, in a broad aspect, embodies indicating means the numbers of which represent the speed at which the machine is traveling and which numbers vary with the speed of the car, in combination with means for enlarging the numbers of said indicating means to the end that the readings will be plainly visible to the driver, whereby a relatively small and compact instrument is produced and one which the driver can inspect without requiring fixed attention, thus leaving the driver free to give attention to the manifold duties required in the operation of the car.

The invention consists, further, of a plurality of rotatable indicating members, preferably a disk and a notched plate positioned in coöperating relation and provided with proper numbers, combined with means for imparting movement intermittently to said members. Said means consists, first, of a device for retarding the rotation of each member, preferably of a magnetic nature, and, second, of a yielding driving device operated by a gear train so as to impart movement to the member to overcome the resistance of the retarding device, all as will be hereinafter more fully explained.

Other features of the invention, and the advantages thereof, will appear from the annexed detailed description.

In the accompanying drawings, I have illustrated different practical embodiments of the invention, but the constructions shown therein are to be understood as illustrative, only, and not as defining the limits of the invention.

Figure 1 is a vertical section through a speedometer constructed in accordance with this invention, the plane of the section being indicated by the dotted line 1—1 of Fig. 2. Fig. 2 is a plan view of the instrument. Fig. 3 is a plan view illustrating certain working parts of the instrument, with the cover, the lens and the lens tube removed. Fig. 4 is a vertical section through a speedometer illustrating another embodiment of the invention, and wherein means are employed for illuminating the indicating mechanism. Fig. 5 is a plan view with the top of the casing and the lens tube removed. Fig. 6 is a vertical section on the line 6—6 of Fig. 4.

The several working parts are housed within a substantially dust-tight casing composed, mainly, of two sections, A, A', said sections being separably coupled together in any suitable way, as for example by the threaded joint shown in Fig. 1. The form and size of the members composing the casing may be varied within wide limits, but it is preferred to employ a substantially frusto-conical upper section A', the latter having a central aperture $a$ for the accommodation of a lens B. The lens is constructed of suitable form to magnify the numbers on an indicating mechanism, and said lens is mounted or supported in a suitable way upon member A' of the casing. With the lens and casing member A' is associated a lens tube B', the latter extending into the chamber of the casing and terminating a suitable distance above the indicating mechanism, the main function of said lens tube being to restrict the field of the indicating mechanism. As shown, the lens tube tapers from its upper to its lower part, and said lens tube is mounted or supported within a flange $a'$ extending downwardly from the aperture $a$ of member A', the lens B being secured in the upper part of said lens tube. The lens tube is screwed into the flange of the casing so as to detachably connect said tube and the lens to the casing, but, obviously, the particular manner of supporting the lens and the lens tube may be modified by a skilled constructor.

Within member A of the casing is a fixed frame member C which may be in the form of a cross bar, shown more particularly in Fig. 3, and below this frame member is another frame member $c$ which may be attached either to frame C or casing A. The two members C, $c$ are provided with bearings for a shaft D, the latter being provided with a gear wheel $d$ which meshes with a gear pinion $d'$ for the purpose of imparting motion to a shaft E, the latter being journaled in a suitable bearing $e$ supported by frame member C, whereby the gears $d$, $d'$ transmit the motion from shaft D to shaft E.

Shaft D is adapted to be driven from a rotary part of the vehicle to which the speedometer is applied. Usually a flexible shaft F is employed to transmit the motion from one wheel of the automobile to the speedometer. With this flexible shaft G is associated a magneto device of any usual or preferred construction, the chief elements of which are indicated at G, G'. The element G of the magneto device is actuated directly by flexible transmission shaft F, whereas the element G' of said magneto device is attached to and rotatable with shaft D, for the purpose of actuating the latter. With the shaft D and the member G' of the magneto device is associated a coiled spring H which is positioned around the shaft D and adjacent to the member G' for the purpose of restoring and retaining the parts in a normal position when they are at rest. I have not considered it necessary to enter into a detailed description of the magneto device and the spring coöperating therewith and with shaft D, for the reason that these parts are of ordinary construction in the art.

The indicating mechanism may be of any suitable form known to the art, but it is preferred to employ a plurality of rotatable members I, I' positioned in coöperative relation to each other and in proximity to the lens tube so that the nearest numbers on the adjacent edges of the two members will be exposed to view through the lens and the lens tube being shown by the dotted line illustration of the lens tube B' in Fig. 3. Member I is a disk having a hub $i$ mounted loosely on the upper portion of shaft E. This disk is held normally at rest by a retarding device which may be either mechanical or magnetic, but in the drawings the device is shown as magnetic, the same embodying a permanent magnet J and a plurality of soft iron pieces $j$ suitably attached to the rotatable member I. The magnet and the soft iron pieces are so related that the magnetic attraction of the magnet for one of the pieces $j$ will restrain the member I from rotation under certain conditions in the operation of the instrument, but when power is applied to the member I sufficient to overcome this magnetic attraction of the permanent magnet for the soft iron pieces $j$, then the member I will be rotated until the next soft iron piece $j$ comes within the field of magnet J, whereupon the rotation of the member I will be checked unless the speed of the vehicle is such as to overcome the resistance afforded by the magnetic attraction between the magnet and its soft iron pieces. It will be recalled that member I is mounted loosely on shaft E which is driven by the gear train from shaft D, and to impart motion intermittently to this member I, I employ pins $k$ depending from the under side of the disk and an arm K attached rigidly to shaft E. Said arm K is positioned on the shaft above bearing $e$, and the arm is preferably in the form of a spring adapted to have a yielding contact with one of the pins $k$ of disk $i$, as shown in Fig. 1, and in dotted lines in Fig. 3. When shaft E is rotated by the gear train, the spring arm K is brought into contact with one pin $k$, and the continued movement of the shaft deflects or bends the spring arm while it is in contact with pin $k$, so that the power exerted will be sufficient to overcome the attraction of magnet J for one of the pieces $j$, whereupon the disk I is turned a certain angular distance and the spring arm K is released from engagement with pin $k$, but when the next piece $j$ comes within the influence of magnet J then the disk is arrested, whereas the shaft E continues to turn under the action of the gear train and the magneto device, the foregoing operations being repeated but being dependent upon the speed of the vehicle.

Member I' of the indicating mechanism is in the form of a star wheel, the edge of which is provided with arcs of circles of the same radius as that of disk I, whereby the star wheel member I' is brought into close operative relation to the circular edge of disk I, so that a single line of demarcation is presented to the view of the driver when looking at the indicating mechanism through the lens. The star wheel member is in a suitable bearing $l'$ of frame member C, the axes of rotation of the two members I, I' being parallel. Said member I' is provided, also, with a series of depending pins $m$ positioned at the points of the star wheel, and on the disk I is an actuating arm M, which extends beyond the periphery of the disk I and is adapted to engage successively with said pins $m$, whereby disk I' is rotated intermittently by motion derived from the rotation of the disk I. With the disk I' coöperates a retarding or checking device consisting of a permanent magnet O and a series of soft iron pieces $o$, the latter being positioned on the star wheel I' at the corners thereof. Said retarding device operates normally to hold the star wheel in a stationary position, but when the arm M of disk I engages with one of the pins $m$ to exert sufficient pressure on said star wheel to overcome the attraction between the magnet and one of its pieces $o$, then the star wheel is turned in a direction to expose another of the numbers on its face below the lens. It will be understood that the members I, I' of the indicating mechanism are provided with numbers to represent the speed in units and tens, the units numbers being provided on the wheel I and the tens numbers on the star wheel I'. The two members I, I' and the numbers thereon are quite small in order that the speedometer may be compact in construction, but these numbers are magnified when viewed through the lens so that the numbers will be very greatly enlarged, as shown in Fig. 2, thus making it very easy for the driver to ascertain by a single glance at the speedometer the speed at which the automobile may be traveling at a given instant of time.

When the several parts are at rest, the spring H acts on the gear train to turn the rotatable members I, I' of the indicating mechanism to zero position, whereby the two zero indications on the members are exposed to view through the lens, as shown in Fig. 3. With the machine traveling at a speed less than ten miles per hour, the transmission shaft operates the magneto device G, G' to drive the shaft D and the gear train in a manner to rotate wheel I and turn the same to a position to indicate the required speed, the proper number being visible through the lens. It will be understood that the retarding device and the means for rotating the wheel I coöperate to impart an intermittent motion to said member I and at certain times the member I is at rest so that the number will be plainly visible through the lens. Should the speed be increased to ten miles per hour, arm M will engage with one pin $m$ and turn the star wheel member I' so that the number 1 on the member I' will engage with the naught on member I to indicate the speed as ten miles per hour. Should the speed be increased to twelve miles per hour, then the number 2 on the member I will be brought into register with the number 1 on the member I' to indicate the speed of the machine as twelve miles per hour, and so on up to any speed under twenty miles per hour, but when the speed reaches twenty miles, then the arm M engages with the next pin $m$ and moves the star wheel so that the number 2 thereon will be brought below the lens so that this number will coöperate with any number on the units disk I to denote that the speed is between twenty and thirty miles per hour. An increase of speed between thirty and forty miles per hour will result in a corresponding actuation of the two disks to indicate the proper speed, and so on up to practically sixty miles per hour, or any speed in excess of sixty miles. It will be observed that the two disks coöperate to afford a single reading of the speed at any one instant of time when the operator inspects the instrument by looking through the lens, the tube of which restricts the field of vision to the number indicating the particular speed, but owing to the employment of the lens, the small numbers on the coöperating members I, I' will be so magnified that the driver can ascertain the speed by a single glance. Manifestly, the instrument is small and compact in construction, embodies comparatively few working parts, and yet affords a means of ascertaining the speed without requiring fixed attention on the part of the driver. When the speed decreases, or the vehicle is brought to a stop, spring H acts to turn the member I backward, and arm K coöperates with one of the two pins $k$ so as to turn the member L' in an opposite direction, the arm K thus being double acting to impel member I' either backward or forward according as the member I is moved forwardly by the magnetic shaft driven mechanism G, G' or backward by the coil spring H, the movement of said members I, I' being intermittent due to the coöperation of the magnetic retarding devices and the arm K with pins $k, k$ and the arm M with pins $m, m$.

In Figs. 4, 5 and 6 there is shown another embodiment of indicating means, with means for illuminating said indicating means, whereby the latter is made plainly visible in the night time. Manifestly, disks I, I' may be of transparent or translucent material, such as celluloid, and an incandescent lamp used to illuminate the indicating means, but when an illuminated speedometer is desired, it may be constructed as in Figs. 4 to 6 inclusive. The indicator shown consists of drums N, N' positioned in coaxial relation, said drums being composed of glass celluloid or other material. Indicating drum N is operated in one direction by magnetic device G, G' in turn operated by flexible shaft F, said drum N being carried by shaft $n$, to which shaft is connected spring H. The drum is provided with suitable numbers, see Fig. 5, and with a series of soft iron pieces $j$, the latter being attracted by retarding magnet J. The other indicating drum N' is loosely mounted on a spindle or arbor $p$, fixed to a stationary frame member P, the spring H having one end anchored on a member $p'$ attached to said arbor $p$. Drum N' is provided with suitable numbers and with soft iron pieces $o$ attracted by magnet O, to retard the rotation. Drum N' is actuated intermittently by the movement of drum N in one direction or the other by the following devices: On the interior of drum N is an arm Q which extends across the line of separation between the two drums, said arm Q being rotatable with drum N. On the interior of drum N' is a series of spring members Q', spaced to correspond substantially to pieces $o$, the free ends of said members Q' being normally out of the path of a shoe $q$ which is supported in a stationary position by an arm attached to spindle $p$. The shoe $q$ is a straight piece with inclined ends, said shoe being in the path of spring members Q' so that when drum N' is held at rest by the attraction of magnet O for one of its pieces $o$, the shoe acts on the free end of one spring member and presses the latter into the path of arm Q which rotates with drum N', the free ends of the other members Q' being all out of the path of said arm Q. The drum N and arm Q can thus rotate when actuated by the shaft-driven magnetic device, but as the drum N completes a rotation and the speed increases, then arm Q will engage the spring member Q' held in its path by shoe $q$, thus turning the drum N' intermittently by motion of drum N. Obviously, as the speed increases, the drum N will be rotated so that arm Q should engage successively with spring members Q' which are brought one after the other into contact with shoe $q$ by the rotation of drum N', said shoe acting to press the spring members Q' successively into the path of the rotating arm Q. The drum N' is thus rotated with an intermittent movement, and the parts Q, Q' are so related and formed that they will impart the desired rotation, in one direction or the other, according as the drum N is rotated by the shaft-driven magnetic device or the coil spring. Should the vehicle stop, spring H returns member N which acts on member N' to return both members to zero positions, the parts Q, Q', $q$ being double acting, or acting in both directions.

Illumination of the transparent drums is afforded by an interior lamp R, supported on spindle $p$ or a frame member. Conductors $r$ supply current from a suitable source through a longitudinal passage $p^2$ provided in the spindle.

While I have illustrated and described a speed indicator of the magnetic type, that is one in which the speed-responsive movement is effected by the principle of magnetic drag, the invention shown is not limited to this type of instrument.

Having thus fully described the invention, what I claim as new, and desire to secure by Letters Patent is:

1. In a speedometer, the combination of speed indicating means provided with characters for denoting speed; yielding means for actuating said indicating means, adapted to cause the positions of the latter to vary in proportion to increase or decrease in the speed, and means for yieldingly arresting the rotation of said indicating means at intervals.

2. In a speedometer, in combination with a rotatable indicating member positioned to afford a direct reading; a driven member; means by which the driven member yieldingly actuates the indicating member, and means for yieldingly arresting the rotation of said indicating member at intervals in its rotation.

3. In a speedometer, the combination with an indicating member having characters for denoting speed; a non-positively driven member; yielding means by which said yieldingly driven member actuates the indicating member, and means for yieldingly retarding the rotation of the indicating member at intervals in its rotation.

4. In a speedometer, the combination of an indicating means provided with characters for denoting speed; a driven member; means by which the driven member yieldingly actuate the indicating member at intervals, and yielding means for retarding the indicating member at corresponding intervals.

5. In a speedometer, in combination with an indicating means mounted for rotation; a driven member; magnetic means operated by said driven member and means for yieldingly connecting said magnetic means with said indicating means, and means for retarding the rotation of said indicating means at intervals in its rotation.

6. In a speedometer, the combination of an indicating member mounted for rotation for indicating speed; a driven member; magnetic means operated by said driven member for actuating the indicating member, and means for intermittently retarding the rotation of said indicating member.

7. In a speedometer, the combination of indicating members positioned in coöperative relation to each other for affording a direct reading; a driven member; magnetic means operated by said driven member for actuating one of the indicating members; means for retarding the rotation of said indicating member; means for intermittently controlling the rotation of said indicating member, and means actuated by said indicating member for intermittently actuating the other indicating member.

In testimony whereof I have signed my name to this specification in the presence of two subscribing witnesses.

WARD G. LEATHERS.

Witnesses:
H. I. BERNHARD,
M. C. RODRIGUEZ.